(No Model.)

A. KIRSCHNER.
SPINDLE FOR SLUBBING, ROVING, AND SIMILAR MACHINES.

No. 581,913. Patented May 4, 1897.

Witnesses;
Harry Bailey
Frank S. Ober

Inventor
Auguste Kirschner
by Wm. W. Rosenbaum
Atty.

UNITED STATES PATENT OFFICE.

AUGUSTE KIRSCHNER, OF ST. ETIENNE-DE-ROUVRAY, FRANCE.

SPINDLE FOR SLUBBING, ROVING, OR SIMILAR MACHINES.

SPECIFICATION forming part of Letters Patent No. 581,913, dated May 4, 1897.

Application filed July 22, 1896. Serial No. 600,142. (No model.) Patented in France February 12, 1896, No. 253,893.

*To all whom it may concern:*

Be it known that I, AUGUSTE KIRSCHNER, engineer, a citizen of the Republic of France, residing at St. Etienne-de-Rouvray, in the Department of Seine-Inférieure, France, have invented certain new and useful Improvements in and Connected with Spindles for Slubbing, Roving, or Similar Machines, (for which I have obtained a French patent, numbered 253,893, dated February 12, 1896,) of which the following is a specification.

This invention relates to the spindles of slubbing, roving, and similar machines employed in spinning cotton.

The object of the invention is to provide means for preventing the choking or binding of the spindles in their collar through the accumulation of fly or greasy waste in the interior of the latter. Owing to the rotary movement of the spindles and the lift or vertical motion of the collars, this waste or fly becomes transformed into compact masses, which are often very hard and act upon the spindles as brakes. The resistance thus set up in opposition to the movements of the spindle and the bobbin-rail necessitate a sensible increase in the power required to drive the machine and cause a greater and quicker wear in these parts and the mechanism which drive them. In order to overcome these defects and disadvantages, a spindle constructed according to this invention is provided or formed with one or more grooves or channels furnished with sharp edges with flaring sides, as will hereinafter appear.

Figure 1:
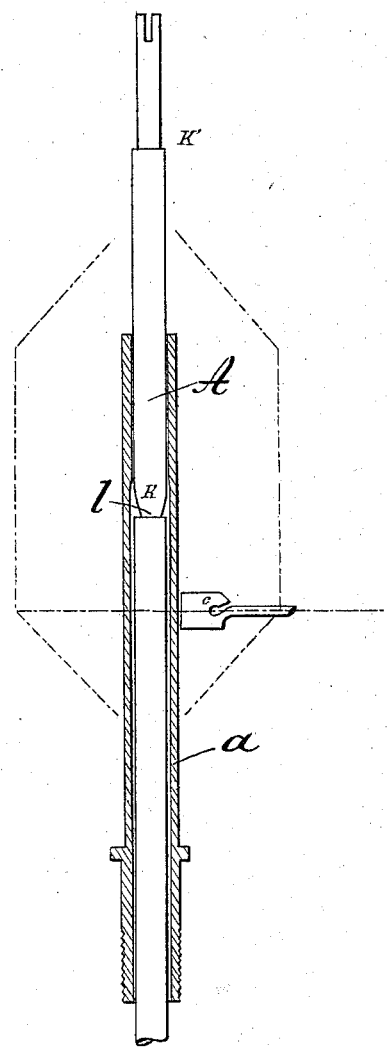
Figure 2:
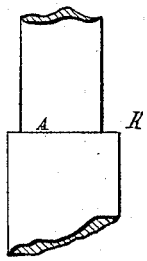

In the accompanying drawings, Figure 1 shows a spindle formed in accordance with my invention and having thereon a collar and upon the collar a bobbin. Fig. 2 is a view of the improved spindle alone and on an enlarged scale, and Fig. 3 is a view of the usual form of spindle.

The spindle A is provided with a conical portion K, formed by gradually reducing the diameter of the spindle from the surface inward to a point where it meets another surface *l*, formed at right angles to the axis of the spindle. This surface *l* and the conical surface K form an annular groove, and the surface *l* where it intersects the surface of the spindle forms a cutting edge. The groove or grooves, for there may be more than one of them, is traversed by the collar *a*, and any fly or waste that it encounters is gathered and cut or broken up by the sharp edge of the groove. When the groove is exposed outside of the collar, the waste that may have collected in it is readily thrown out because of the flare or cone which gives form to the groove.

Figure 3:
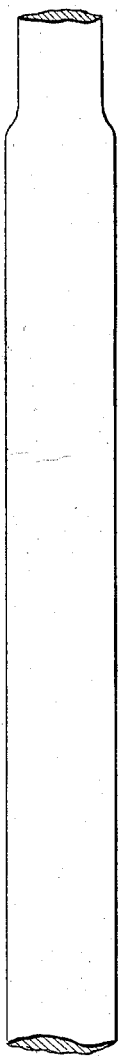

The upper end of the spindle which carries the flier may be formed with a sharp edge or shoulder K′, as illustrated in Figs. 1 and 2, instead of with the usual rounded shoulder, as shown in Fig. 3. The object of this sharp edge is to detach and remove any fly or waste which may accumulate within the bore of the bobbin.

Having now described my invention, I declare that what I claim is—

A spindle for slubbing, roving, and similar machines having a groove or grooves formed in that part of its length which is traversed by the collar for the purpose of detaching or removing any fly which may accumulate within the collar, said groove being formed by a conical or flaring surface on the spindle intersecting another surface formed at right angles to the axis of the spindle.

In testimony that I claim the foregoing as my invention I have signed my name, in presence of two witnesses, this 4th day of July, 1896.

AUG. KIRSCHNER.

Witnesses:
S. BEUSEHI,
CANNEETT.